United States Patent [19]

Scheinert

[11] Patent Number: 5,546,914
[45] Date of Patent: Aug. 20, 1996

[54] ARRANGEMENT FOR RECIRCULATING EXHAUST GAS IN AN INTERNAL COMBUSTION ENGINE

[75] Inventor: Helmut Scheinert, Ebersbach/Fils, Germany

[73] Assignee: Mercedes-Benz AG, Stuttgart, Germany

[21] Appl. No.: 502,003

[22] Filed: Jul. 13, 1995

[30] Foreign Application Priority Data

Jul. 14, 1994 [DE] Germany ............................ 44 24 802.4

[51] Int. Cl.⁶ .............................. F02M 25/07; F01L 25/02
[52] U.S. Cl. ....................... 123/569; 123/571; 123/90.12
[58] Field of Search .................... 123/90.11, 90.12, 123/90.15, 90.16, 90.17, 90.6, 568, 569, 571, 90.23

[56] References Cited

U.S. PATENT DOCUMENTS

| | | | |
|---|---|---|---|
| 4,206,728 | 6/1980 | Trenne | 123/90.12 |
| 4,357,917 | 11/1982 | Aoyama | 123/568 |
| 4,620,510 | 11/1986 | Feuling | 123/90.6 |
| 4,722,315 | 2/1988 | Pickel | 123/568 |
| 5,123,397 | 6/1992 | Richeson | 123/571 |
| 5,224,460 | 7/1993 | Havstad et al. | 123/568 |
| 5,406,918 | 4/1995 | Joko et al. | 123/569 |

FOREIGN PATENT DOCUMENTS

| | | |
|---|---|---|
| 2133288 | 1/1972 | France . |
| 3437330 | 8/1992 | Germany . |
| 3-202603 | 9/1991 | Japan . |

*Primary Examiner*—Willis R. Wolfe
*Attorney, Agent, or Firm*—Klaus J. Bach

[57] ABSTRACT

In an arrangement for recirculating exhaust gas in a four-stroke internal combustion engine, especially a diesel engine, having a cylinder with intake and exhaust valves and means for timely opening the intake and exhaust valves during the engine intake and exhaust strokes, the means for opening the intake valves include supplementary means for actuating the intake valves also during the engine exhaust stroke in a timed manner such that a portion of the exhaust gas is discharged into the engine intake manifold to be subsequently recirculated into the cylinder during the next intake stroke.

4 Claims, 2 Drawing Sheets

ARRANGEMENT FOR RECIRCULATING EXHAUST GAS IN AN INTERNAL COMBUSTION ENGINE

The invention relates to an arrangement for recirculating exhaust gas in an internal combustion engine.

By the recirculation of exhaust gas in internal combustion engines, it is possible to reduce emissions of noxious substances, in particular the emission of nitrous oxides, without significant losses in terms of consumption and performance of the internal combustion engine.

To this end, generally, some of the exhaust gas produced during combustion is cooled as far as possible in the engine and recirculated to the cylinder during the intake stroke in a metered fashion.

It is disadvantageous in all the methods of recirculating exhaust gas known in the art, that the corrosive and moist exhaust gas which contains particles has to flow past contamination sensitive components in the intake section of the engine since this may adversely affect the operation of those components.

JP-03-202603 discloses an opening and closing device for valves in internal combustion engines which is also adapted, to provide for recirculation of exhaust gas.

For this purpose, the cams of the exhaust valves of the internal combustion engine each have an additional projection so that the exhaust valve is opened momentarily during the intake stroke and some of the exhaust gas which was previously discharged by the piston of the internal combustion engine can return during the intake stroke from the exhaust gas manyfold into the combustion chamber.

However, with the device described in the aforementioned publication, it is disadvantageous that the exhaust gas flows into the combustion chamber of the internal combustion engine only at a relatively late point in time, during the intake stroke so that only a small amount of time is available to cool the exhaust gas before the next compression stroke. As a result, the temperature in the combustion chamber is increased very quickly and the fresh gas, which is also sucked in, is heated and expands correspondingly. Consequently, a smaller mass of fresh air enters the combustion chamber, which leads to a decrease in the volumetric efficiency of the engine.

A further disadvantage of the opening and closing mechanism disclosed in the aforementioned publication is that exhaust gas returns from the exhaust manifold into the combustion chamber only if the pressure in the combustion chamber is lower than in the exhaust manifold. However, a characteristic gas pressure diagram of an internal combustion engine indicates that this is often not the case at the points which are important for the recirculation of the exhaust gas, that is, the pressure in the cylinder is often higher than in the exhaust manifold so that fresh air may possibly flow from the combustion chamber into the exhaust manifold thereby reducing engine efficiency.

It is, therefore, the object of the present invention to provide an arrangement for returning exhaust gas to the combustion chamber of an internal combustion engine, which provides for sufficient time to cool down the exhaust gas before it is returned into the combustion chamber and which achieves a good volumetric engine efficiency.

SUMMARY OF THE INVENTION

In an arrangement for recirculating exhaust gas in a four-stroke internal combustion engine, especially a diesel engine, having a cylinder with intake and exhaust valves and means for timely opening the intake and exhaust valves during the engine intake and exhaust strokes, the means for opening the intake valves include supplementary means for actuating the intake valves also during the engine exhaust stroke in a timed manner such that a portion of the exhaust gas is discharged into the engine intake manifold to be subsequently recirculated into the cylinder during the next intake stroke.

By opening the intake valve also during the engine exhaust stroke, preferably at the beginning of the exhaust stroke, for a controlled period of time, exhaust gas is forced through the intake valve into the intake manifold. The heat energy present in the exhaust gas can then be transferred to the walls of the intake manifold or to a heat exchanger which may also be present in the intake manifold so that the exhaust gas is cooled. After the desired quantity of exhaust gas has been discharged through the intake valve, the intake valve is closed again while the exhaust valve remains open until the exhaust stroke is completed. The exhaust gas which is released into the intake manifold during this process is returned into the cylinder during the next intake stroke, and is again subjected to the combustion process in the combustion chamber during the subsequent combustion stroke.

Since, in this manner the exhaust gas is cooled, the fresh gas with which it is mixed is heated only slightly or not at all, so that a good volumetric engine efficiency is achieved.

Operation of the intake valve takes place in a simple way by means of a supplementary device which can be integrated without difficulty into existing internal combustion engines.

Below, two exemplary embodiments of the present invention are described in principle with reference to the drawing.

DESCRIPTION OF PREFERRED EMBODIMENTS

Figure 1:
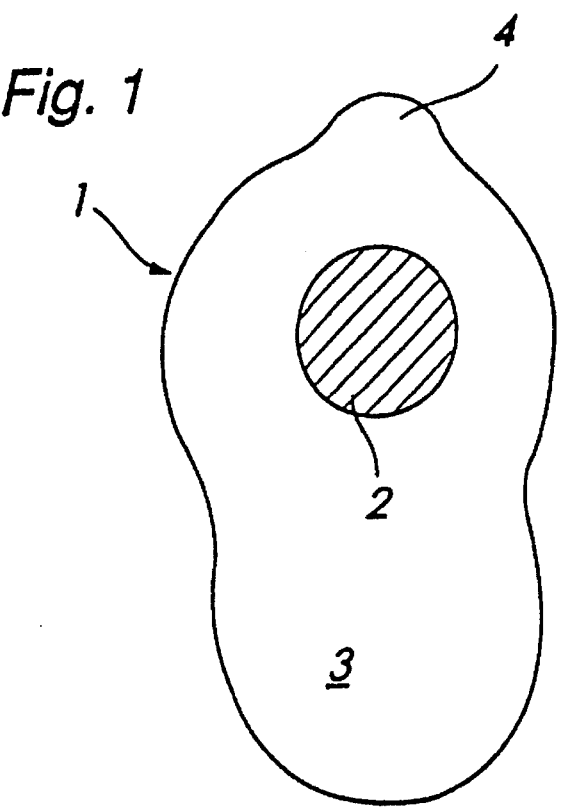
FIG. 1 shows a cam of a camshaft.
Figure 3:
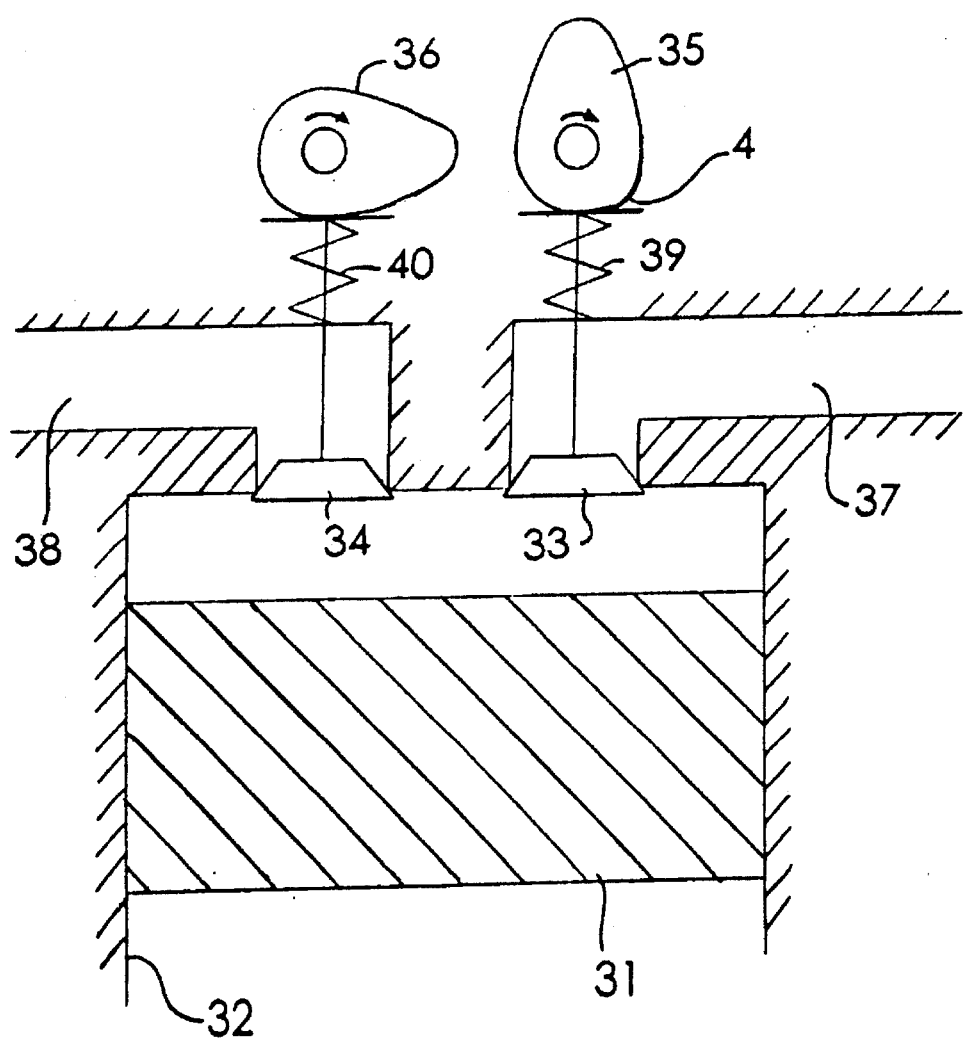
FIG. 3 shows schematically an engine cylinder with another valve operating mechanism.

As shown in FIG. 1, a cam is mounted on a camshaft 2, which is rotatably supported for operating engine intake and exhaust valves as shown schematically in FIG. 3 wherein a piston 31 is shown movably disposed in a cylinder 32. The cylinder 32 includes intake and exhaust valves 33 and 34 which are actuated by cams 35 and 36 for controlling the gas flow into and out of the cylinder 32 through intake and exhaust passages 37 and 38. The valves 33 and 34 are normally closed by springs 39 and 40. FIG. 1 shows specifically a cam 1 for an intake valve.

During rotation of the camshaft 2, the intake valve of the internal combustion engine is opened by a first cam area 3 of the cam 1 and also subsequently closed again as a result of the valve spring which is compressed during opening of the intake valve.

On the side of the cam 1, i.e. offset by approximately a 180° (90°–180°) cam angle, a supplementary cam structure 4 or a corresponding elevation or a hump is arranged. The supplementary cam structure 4 ensures that the intake valve of the internal combustion engine opens again during the exhaust stroke, the opening time and the opening cross-section of the intake valve being dependent on the exact location and the shape of the supplementary cam structure 4.

The opening cross-section of the intake valve can be additionally controlled by an arrangement for controlling the valve play of the intake valve. With such an arrangement, the inlet valve can be prevented, for example, from being opened by the supplementary cam 4. The control of the valve play of the intake valve is made dependent on the characteristic diagram data of the internal combustion engine so that the recirculation of exhaust gas or the recirculation quantity of exhaust gas can be controlled as a function of the instantaneous location within the characteristic diagram of the internal combustion engine. Devices for changing the valve play are generally known in the art and therefore need not be described.

Figure 2:
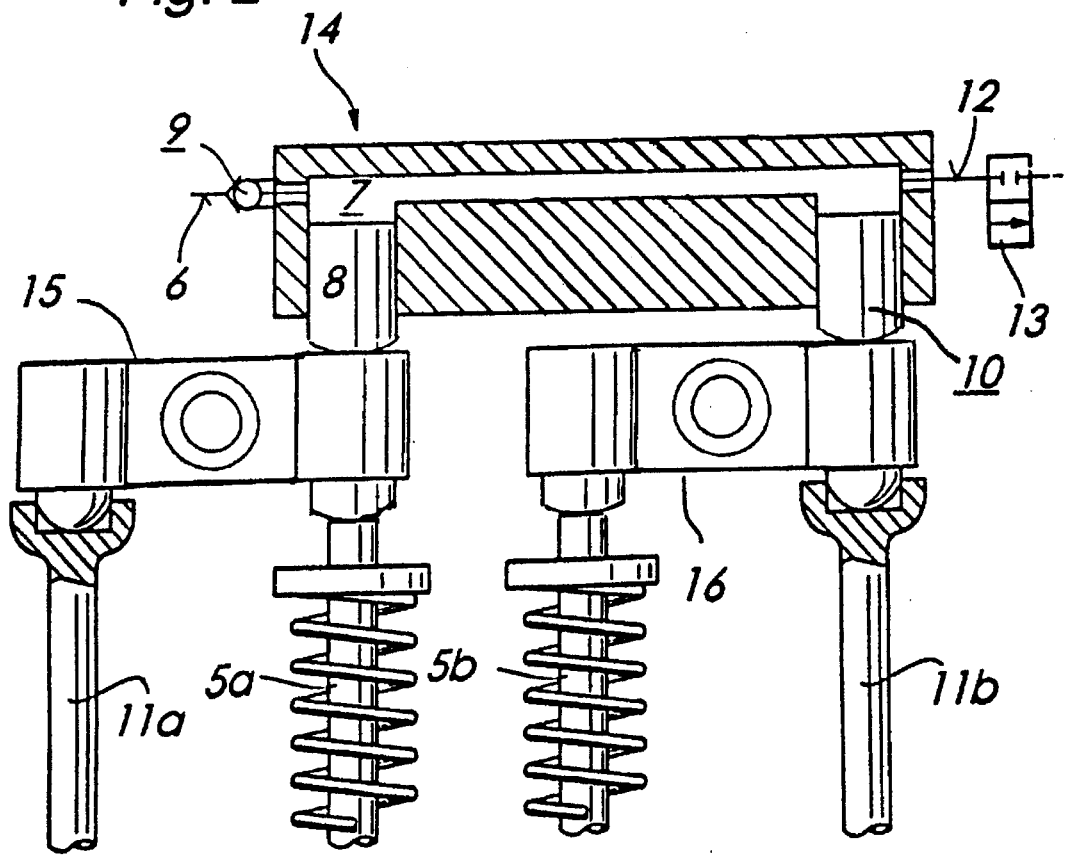
FIG. 2 shows a valve operating mechanism with a hydraulic valve control arrangement.

FIG. 2 shows a second exemplary embodiment of the arrangement for recirculating exhaust gas in an internal combustion engine.

Here, an inlet valve 5a and an exhaust valve 5b are operated in a conventional manner by push rods 11a and 11b via rocker arms 15 and 16. A hydraulic control arrangement 14 is disposed over the rocker arms 15 and 16 for interaction between the exhaust valve rocker arm 16 and the intake valve rocker arm 15. The hydraulic control arrangement 14 includes a hydraulic space 7 providing communication between a bore with a piston 8 and a bore with a piston 10. Piston 10 abuts the exhaust valve rocker arm 16 above the push rod 11b so that it is actuated when the exhaust valve is opened by the push rod 11b thereby pressurizing hydraulic fluid in the space 7. Piston 8 abuts the intake valve rocker arm 15 and is operated by the pressurized fluid in the space 7 so as to actuate the rocker arm 15 and open the intake valve 5a when the outlet valve 5b is opened.

Hydraulic fluid is supplied to the space 7 from a supply line 6 which is provided with a non-return valve 9 to prevent the return flow of the hydraulic fluid from the space 7 into the supply line 6.

The hydraulic fluid can flow out of the space 7 via a discharge line 12 which includes a solenoid valve 13.

The arrangement is activated when hydraulic fluid is supplied through the supply line 6 into the space 7 in order to open the intake valve 5a during the internal combustion engine exhaust stroke. If, at the same time, the solenoid valve 13 is in its closed position (illustrated in FIG. 2), the intake valve 5a is opened simultaneously with the exhaust valve 5b. However, the solenoid valve 13 is opened after a specific period of time thus permitting hydraulic fluid to flow out of the space 7 through the discharge line 12 so as to permit the intake valve 5a to close again. The time during which the solenoid valve 13 is closed is dependent on a characteristic diagram control for the internal combustion engine.

Opening the intake valve during the exhaust stroke of the internal combustion engine permits some exhaust gas, which is normally discharged only through the exhaust valve, to return into the intake manifold of the internal combustion engine. With this arrangement, recirculation exhaust gas is returned only to the intake manifold whereby peripheral components of the internal combustion engine such as a supercharger or an air intercooler, are not exposed to the exhaust gas. Corrosive and moist exhaust gas which also contains particles will therefore not adversely affect these contamination-sensitive components or impair their operation. A further advantage of the described arrangement is the possibility of accurately controlling the opening duration of the intake valve during the exhaust stroke and thus the recirculation rate of the exhaust gas over the entire characteristic diagram of the internal combustion engine.

With the arrangement according to the invention relatively high exhaust gas recirculation rates can be achieved essentially without adversely affecting the gas flow through the engine.

What is claimed is:

1. An arrangement for recirculating exhaust gas in a four-stroke internal combustion engine, especially a diesel engine, having at least one cylinder with at least one intake and one exhaust valve and mechanical means for timely opening said intake and exhaust valves during the engine intake and exhaust strokes, respectively, said means for opening said intake valve including a hydraulic force transfer structure disposed between said means for opening said exhaust valve and said intake valve for actuating said intake valve also during the engine exhaust stroke for discharging a portion of the exhaust gas from said cylinder through said intake valve and including a solenoid valve capable of timely releasing fluid from said hydraulic force transfer structure for permitting said intake valve to close in a controlled manner after being actuated during the engine exhaust stroke by said hydraulic force transfer structure.

2. An arrangement according to claim 1, wherein means are provided for controlling the valve play of said inlet valve.

3. An arrangement according to claim 1, wherein said solenoid valve is operable under the control of a characteristic diagram.

4. An arrangement according to claim 2, wherein the valve play of the intake valve is variable under the control of a characteristic diagram.

\* \* \* \* \*